US007367175B2

(12) United States Patent
Scott

(10) Patent No.: US 7,367,175 B2
(45) Date of Patent: May 6, 2008

(54) METHOD AND APPARATUS FOR HAY RAKE

(76) Inventor: Cecil Scott, 12397 Fm1511, Buffalo, TX (US) 75831

(*) Notice: Subject to any disclaimer, the term of this patent is extended or adjusted under 35 U.S.C. 154(b) by 0 days.

(21) Appl. No.: 11/036,120

(22) Filed: Jan. 14, 2005

(65) Prior Publication Data
US 2005/0172602 A1   Aug. 11, 2005

Related U.S. Application Data

(60) Provisional application No. 60/536,448, filed on Jan. 14, 2004.

(51) Int. Cl.
A01D 39/00 (2006.01)
A01D 43/02 (2006.01)
A01D 75/00 (2006.01)

(52) U.S. Cl. .............................. 56/341; 56/377; 56/385

(58) Field of Classification Search .................. 56/228
See application file for complete search history.

(56) References Cited

U.S. PATENT DOCUMENTS 5,404,702 A * 4/1995 Lewis ........................ 56/365
5,412,929 A * 5/1995 Urbain et al. ................ 56/15.4
5,987,864 A * 11/1999 Lutz ............................ 56/377
6,105,354 A * 8/2000 Luhn et al. ................... 56/385

* cited by examiner

Primary Examiner—Árpád Fábián Kovács
(74) Attorney, Agent, or Firm—Rick B. Yeager

(57) ABSTRACT

An adapter kit is provided to permit modification of a hay rake to permit single pass hay raking and hay baling. The adapter kit provides an adapter main beam which supports the hay rake with a v-shaped braced rear main beam support positioned between the hay rake main beam and the adapter main beam, and a front main beam support positioned between the hay rake main beam and the adapter main beam. The rear main beam support and the front main beam support may be bolted or welded to the hay rake frame. A drive shaft is supported by the adapter main beam, such that a first end of the drive shaft may be connected to a tractor power take off, and the second end may be connected to a baler. The adapter kit includes hydraulic hoses and connectors to provide hydraulic controls from the tractor to the rake and to the baler.

12 Claims, 6 Drawing Sheets

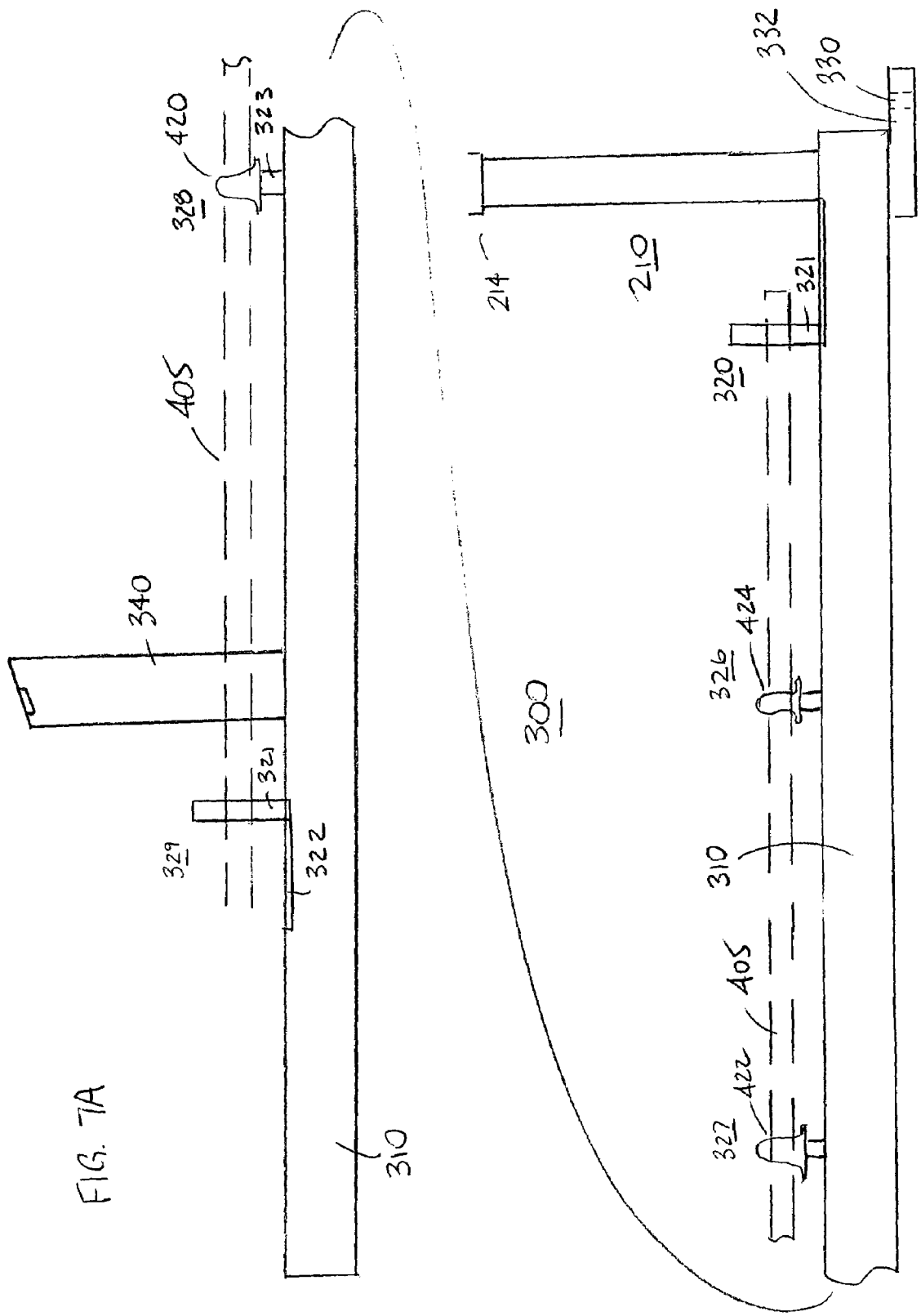

METHOD AND APPARATUS FOR HAY RAKE

RELATED APPLICATIONS

This utility patent application claims the benefit of Provisional Patent Application No. 60/536,448 filed Jan. 14, 2004.

FIELD OF INVENTION

This invention relates to a method and apparatus for adapting a hay rake such as a H&S BF12HC™ so that a tractor can pull the modified rake apparatus with a hay baler attached to rake apparatus in order to rake and bale hay in a single pass.

The invention also may be used on smaller or larger rakes including other wheel rakes.

BACKGROUND

There is a need for a cost effective apparatus for combining hay raking and baling operations in the single pass of a tractor.

There are two major types of hay rakes—hydraulic rakes and wheel rakes. Hydraulic rakes are typically more expensive to purchase and to maintain than wheel rakes, but in some applications such as high-volume hay production on level fields, hydraulic rakes are desirable. For other operations, such as lower-volume operations or fields that are relatively rough, wheel rakes are preferable.

There is a need to provide an economical method of adapting rakes to pull a baler in order to permit a single pass raking and baling operation.

Prior art is discussed in U.S. Pat. No. 6,105,354 to Luhn, et al.

The Luhn device is a heavy-duty and relatively expensive modification of a hydraulic rake. The Luhn apparatus requires a relatively large tractor to pull the device and hay baler. While commercial hay growers may be able to afford and justify the Rakehand™ product, there are a large number of smaller operations that cannot justify the purchase and maintenance expense of the device.

There are several disadvantages to the Luhn rake device. Its relatively high cost is the result of using a hydraulic rake as the raking device, whereas wheel rakes are less expensive. Another high cost element in the Luhn rake is its custom rear wheel assembly which replaces the existing hydraulic rake rear wheel assembly. In one embodiment of the current invention, the rear wheel assembly comprises the factory wheel rake rear wheel assembly.

In some level-field applications, the hydraulic rake offers advantages such as better hay pickup, than a wheel rake. In other applications, such as relatively rough fields common to many smaller producers, the wheel rake is much more robust than the hydraulic rake. On rough fields, the individual rake units of a hydraulic rake tend to be broken—which results in delay and increased maintenance expense.

It is desirable to provide a practical retrofit kit for commercially available wheel rakes such as the H&S Hi Capacity Rake™.

SUMMARY

The invention is directed toward an apparatus and method for attaching a pull frame and drive mechanism to a hay rake so that the modified rake can pull a hay baler. In one embodiment of the current invention, a wheel rake is modified by attaching an adapter frame main beam with rear angle supports and a modified neck and vertical support front assembly. The adapter frame main beam supports an extended drive shaft, supports a front hitch for attachment to a tractor, and supports a rear hitch for attaching a baler.

BRIEF DESCRIPTION OF THE DRAWINGS

These and other objects and advantages of the present invention are set forth below and further made clear by reference to the drawings and photographs, wherein:

FIG. 7A is an exploded view of major components of an adapter frame for a wheel rake.

DETAILED DESCRIPTION OF EMBODIMENT

Wheel Rake Modified with Frame Attachment Kit

Figure 1:
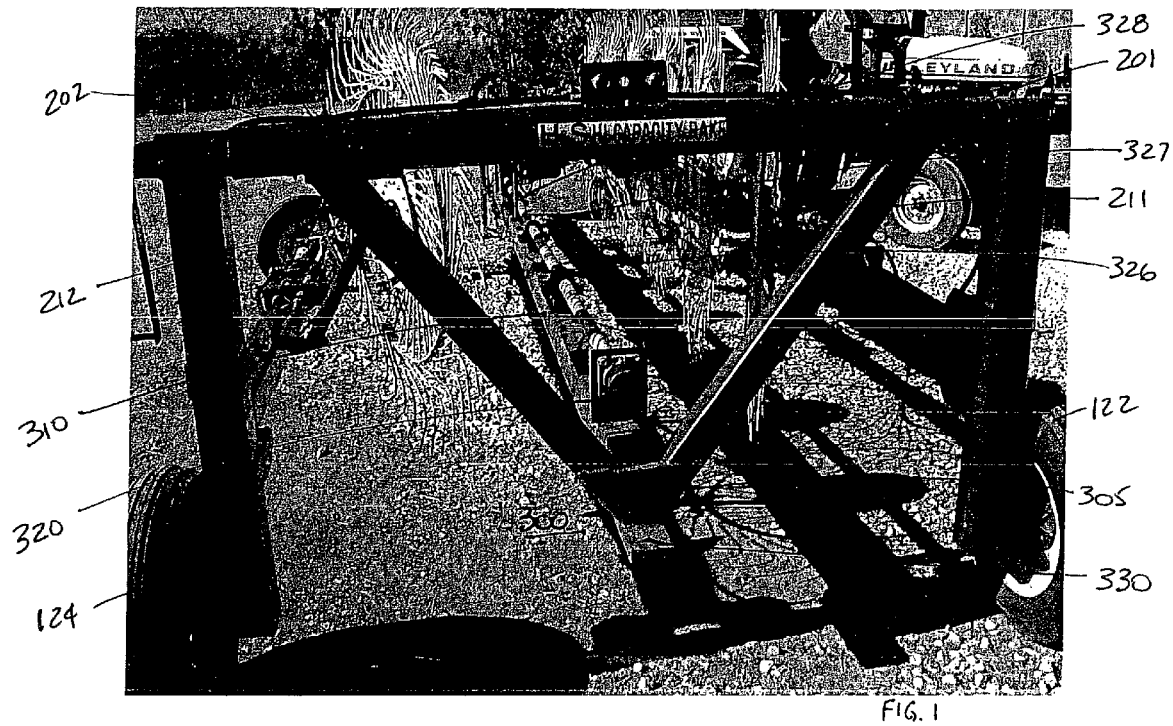
FIG. 1 is rear view of an embodiment of a modified rake device.

Referring now to FIG. 1 which is rear view of an embodiment of a modified wheel rake device, the device includes the existing frame of an H&S Hi Capacity Rake™ wheel rake 100. In this example, the rake has 12 wheels, but other models including a 20-wheel model may be used.

The wheel rake frame has been modified with a frame attachment kit. In this embodiment, a right bracket 201 and a left bracket 202 have been welded to the rear cross member 110 of the rake. In this example, the brackets are welded to right diagonal support 211 and a left right diagonal support 212 respectively to form a v-shaped rear main beam support. In other embodiments, the angle brackets will include plates or channel that can be removably bolted to the right and left brackets so that the frame kit may be removed for re-use on another rake.

The right diagonal support 211 and a left right diagonal support 212 support a adapter main beam assembly 300, which in this example includes a reinforcement plate 305; an adapter frame main beam 310 such as a 4"×6" tube of steel thickness 5/16" or 3/8", rear shaft support bracket 320; intermediate shaft supports 326, 327, and 328; a rear pin hitch 330; and other elements shown in other views.

Unlike prior art designs, this embodiment does not replace the rear of the rake with a special rear wheel assembly. In some embodiments, the rake tires 122 and 124 may be replaced with larger tires such as implement flotation tires. Otherwise, the rear wheel assembly is not changed from that supplied by the rake manufacturer.

Figure 2:
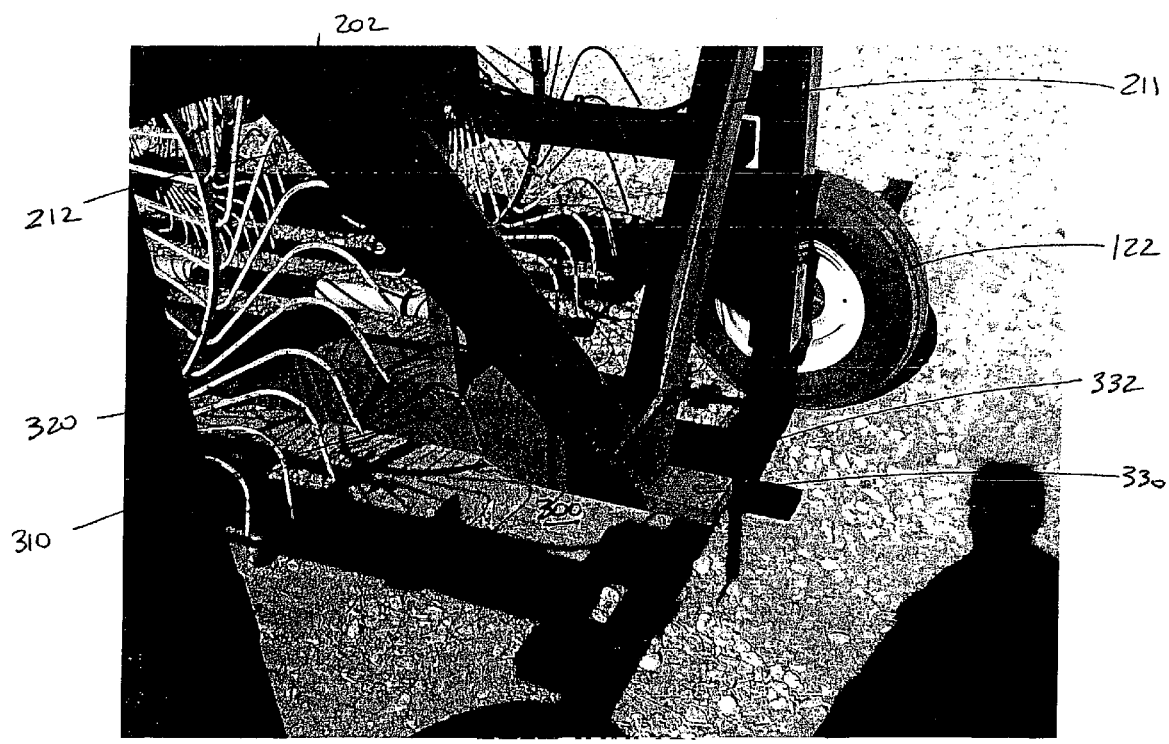
FIG. 2 is rear side view of an embodiment of the device of FIG. 1

Referring now to FIG. 2 which is a rear side view of an embodiment of the device, the position of the rear hitch 330 in this embodiment is approximately 3-5 inches behind the rear wheel axle centerline. This distance is appropriate for balers sold by John Deere, New Holland, Vermeer, etc. As the hitch is moved forward, the baler has a tendency to make narrower bales than desired; and as the hitch is moved further to the rear of the rake, the baler tends to leave a strip of hay on each side. When the rear hitch is properly located, the baler works effectively to deliver a consistent width of bales without leaving hay on the sides.

In this embodiment, the rear pin hitch is provided on a section of steel bar 332 welded to the bottom of the adapter frame main beam 310. In this embodiment, with a typical baler, the rear hitch supports a tongue weight of about 2000 pounds with an empty baler and less tongue weight as the bale grows.

In this embodiment, the hitch is about five (5) inches above the centerline of the rake wheels. With standard rake wheels, the hitch is about seventeen (17) inches above the ground. With larger replacement wheels, the rear hitch is about nineteen (19) inches above the ground.

Figure 3:
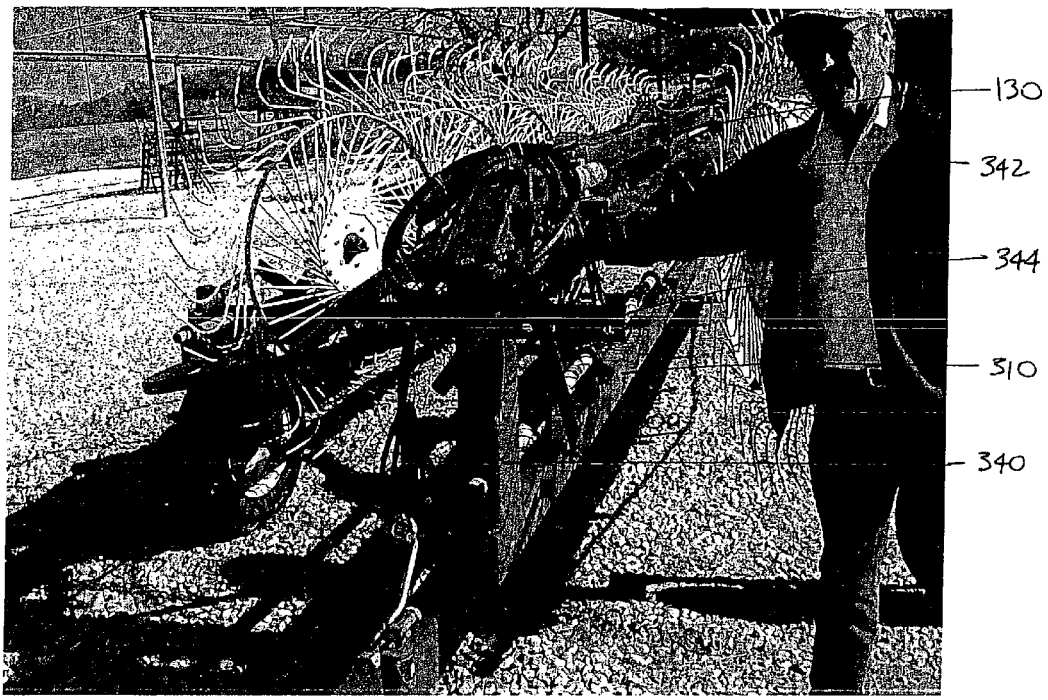
FIG. 3 is a front view of an the device of FIG. 1 with the rake in a folded position

Referring now to FIG. 3 which is a front view of an embodiment of the device with the rake in a folded position, the adapter main beam assembly 300 further includes a vertical support beam 340 positioned between the adapter frame main beam 310 and the existing rake main beam 130. This vertical beam is a front main beam support, and may include brackets such as 342 to hold the jack stand or rake arm folded position holders 344.

Figure 4:
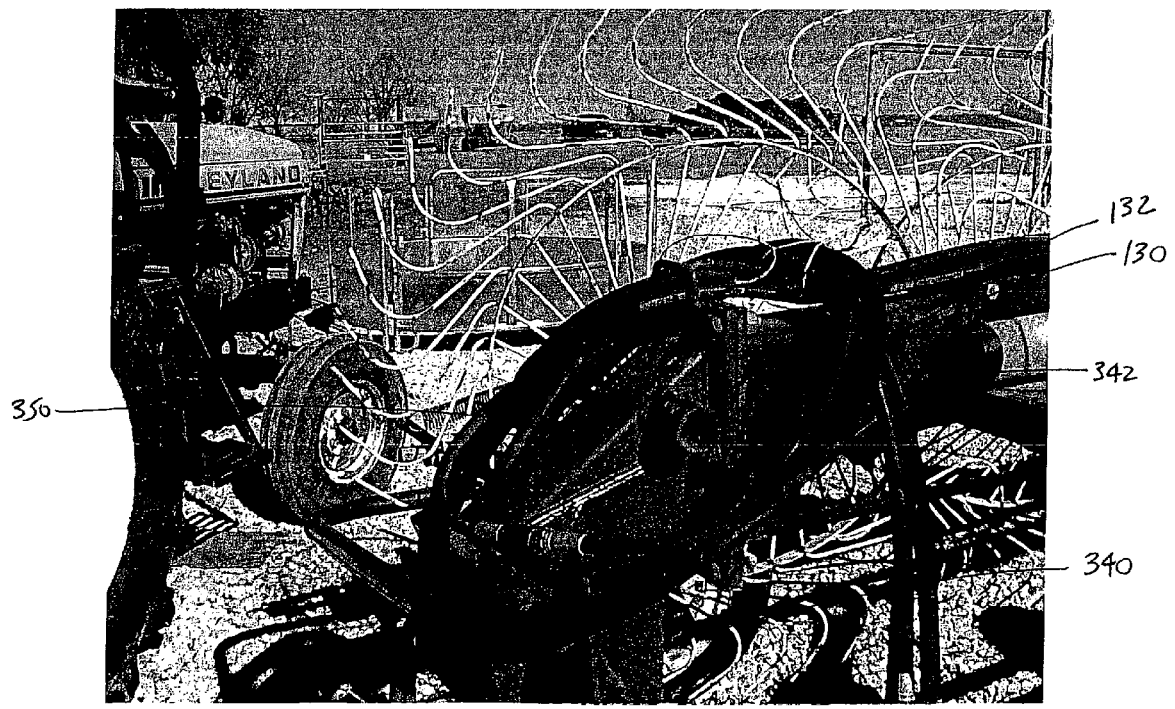
FIG. 4 is detailed of the neck of the device of FIG. 1.

Referring now to FIG. 4 which is a detailed view of the neck of the rake device, the vertical support beam 340 includes a neck portion 350 which is bolted to a flange 132 on the rake main beam 130. This neck is typically salvaged from the rake neck as supplied by the manufacturer. The existing neck is cut off, a flange is welded to the main beam, the neck is adapted to fit on the vertical beam, and the revised neck is bolted or welded to the flange on the main beam.

In order to remove the adapter frame from the rake, the neck flange bolts are removed, and the rear angle brackets are removed (preferably by unbolting them from the rear bracket supports.) The frame can then be removed from the rake.

Figure 5:
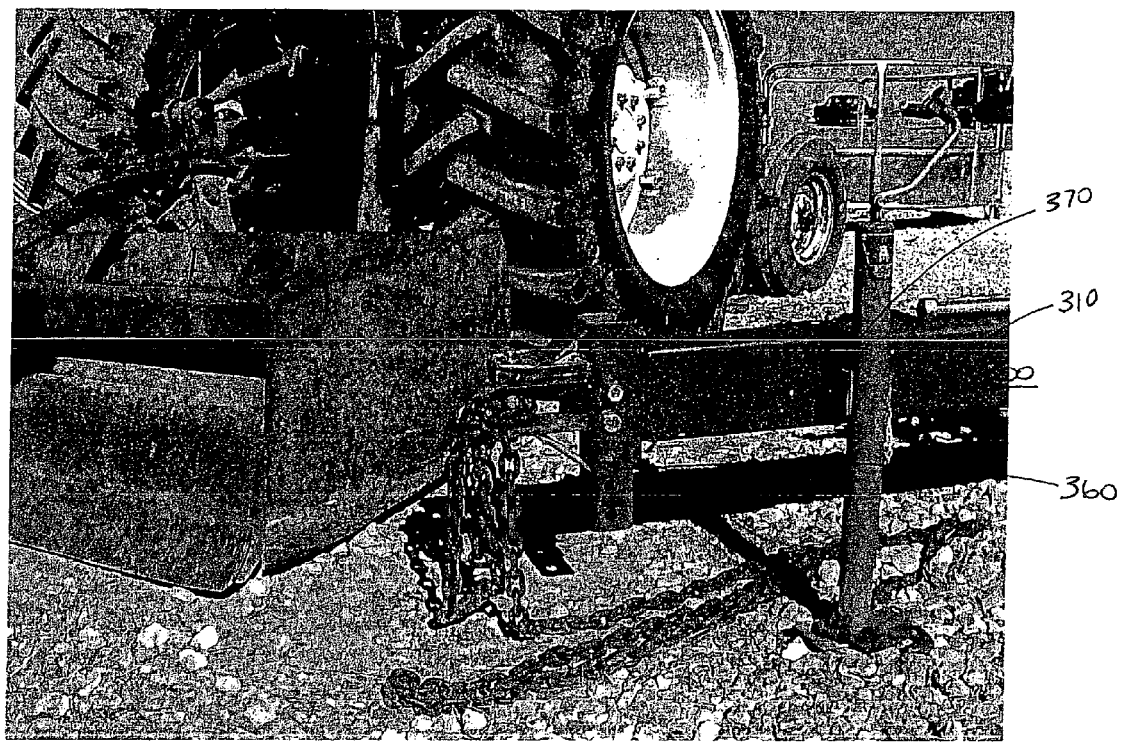
FIG. 5 is a detailed view of the front of the transverse beam assembly of the device of FIG. 1.

Referring now to FIG. 5 which is close up view of the front of the adapter main beam assembly 300, the adapter frame main beam 310 extends forward from the vertical support beam, and includes an adjustable height front hitch assembly 360 and a jack support bracket 370.

Figure 6:
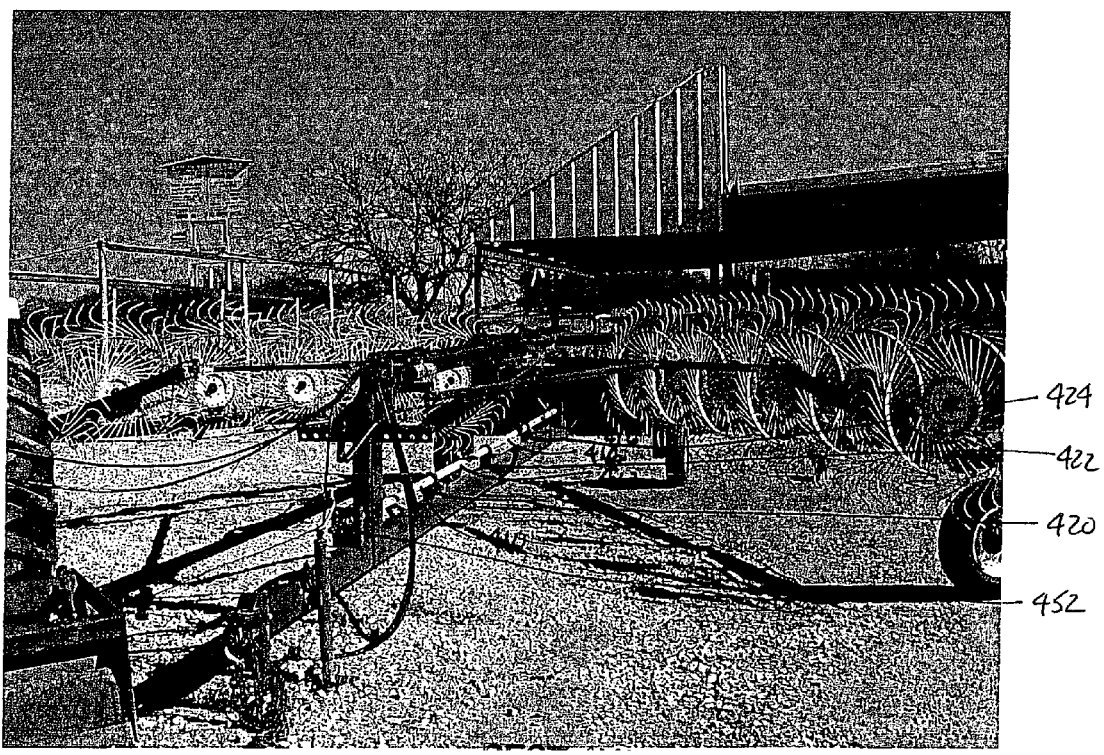
FIG. 6 is a front view of the rake apparatus of FIG. 1 in an unfolded position.

Referring now to FIG. 6 which is a front view of the rake apparatus in an unfolded position, the drive shaft is a 1⅜" steel shaft protected by shaft covers 410, 412, 414, and 416 such as 1½" PVC pipe sections and supported by 4500 pound carrier bearings 420, 422, and 424. The shaft is also supported by a front bracket 450 and a rear bracket. The shaft may be provided with a John Deere 4010™ spline shaft end piece which may be attached directly to the shaft such as with a flange fitting. Preferably, the end pieces are provided with a keyed fitting 452. Preferably a four (4) foot telescoping PTO shaft is used to couple the tractor PTO with the front shaft fitting.

Not shown in FIG. 6 is an optional, but recommended, front rake wheel assembly which may be removably attached to the neck or vertical support. This rake wheel assembly is typically provided as optional equipment by the rake manufacturer. Applicant recommends installing this front rake wheel assembly to provide a more uniform hay bale.

DETAILED DESCRIPTION OF EMBODIMENT

Wheel Rake Adapter Kit with Adapter Frame

In this embodiment, an adapter kit is provided for retrofitting a rake, such as an H&S Wheel Rake. The adapter kit includes an adapter frame as discussed below which provides support for the front and rear hitches to connect the modified rake to a tractor and a baler, and provides support for the shaft from the tractor PTO to the baler. The adapter kit also includes hydraulic hoses, a power cable to the baler, a front hose guard to protect the hydraulic hose from the tractor PTO shaft, and an optional electric power splitter.

FIG. 7A is a side view of major components of an adapter frame for bolting on to a wheel rake. The adapter main beam assembly 300 includes an adapter frame main beam 310 such as a 4"×6" tube of steel thickness 5/16" or ⅜". The adapter main beam assembly supports a drive shaft 405 with a rear shaft support bracket 320; intermediate shaft supports 326, 327, and 328, and a front shaft support bracket 329. The front and rear support brackets include a segment of channel 321 welded to a reinforcing plate 322. Tubing segments 323 on the intermediate brackets provide mounting surfaces for the shaft carrier bearings 420, 422, and 424. A rear pin hitch 330 is provided on a section of steel bar 332 welded to the bottom of the adapter frame main beam 310.

Figure 7B:
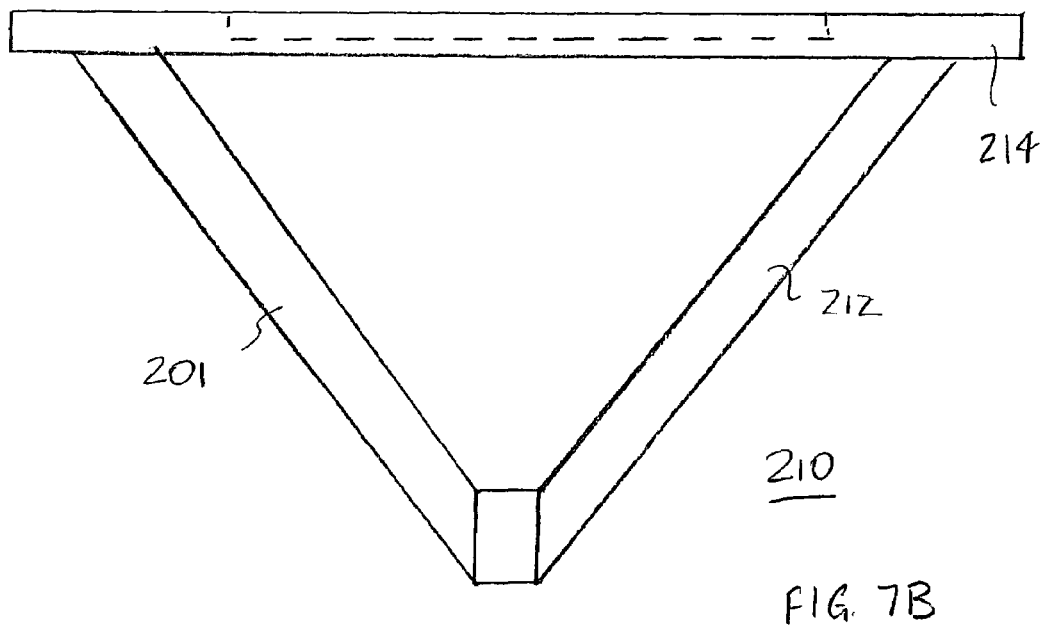
FIG. 7B is a rear view of the rear beam support for the adapter frame of FIG. 7A.
Figure 7C:
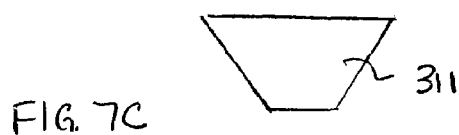
FIG. 7C shows the rear plate bracket for the rear beam support of FIG. 7B.
Figure 7D:
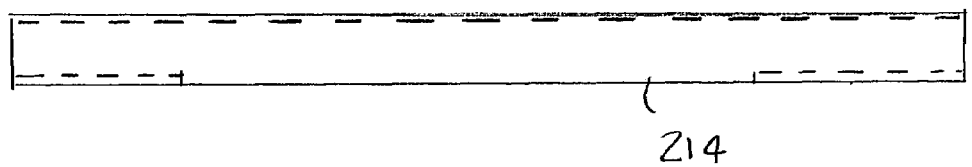
FIG. 7D shows the rear beam support upper channel for the rear beam support of FIG. 7B.

FIG. 7B is a rear view of the rear beam support 210 for the adapter frame of FIG. 7A. The rear beam support 210 includes a right diagonal support 211 and a left right diagonal support 212 which may be bolted to the rear cross member 110 (not shown) of the rake. FIG. 7C shows a rear plate bracket 311 which is used to close the tubing of the main support beam and to reinforce the right bracket and left bracket. In this example, the rear beam support 210 is attached with four U-bolts which clamp the rear beam support upper channel 214 to the rear cross member 110 (not shown) of the hay rake. FIG. 7D shows the rear beam support upper channel 214 for the rear beam support of FIG. 7B.

Figure 7E:
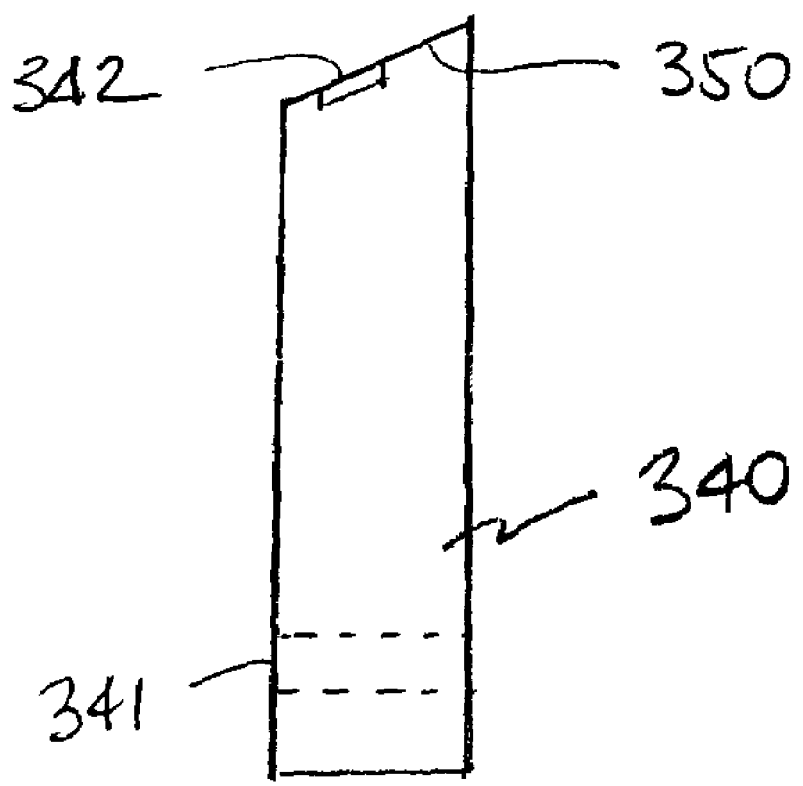
FIG. 7E shows the vertical support beam for the adapter frame of FIG. 7A.

FIG. 7E shows the vertical support beam 340 for the adapter frame of FIG. 7A. In this example, the beam has a length of 22 feet 8 inches. The vertical support beam 340 includes a neck portion 350 which may be bolted to a flange on the rake main beam after unbolting and removing the rake neck as provided by the rake manufacturer. A 3 inch pipe sleeve is provided in the vertical support beam to permit the shaft to be placed through the beam.

The adapter frame main beam 310 extends forward from the vertical support beam, and may include an adjustable height front hitch assembly 360 (not shown) and a jack support bracket 370 (not shown).

A drive shaft is typically provided on the adapter beam as discussed in the embodiment above.

DETAILED DESCRIPTION OF EMBODIMENT

Method of Converting Hay Rake

An adaptor such as that described in the embodiment above can be installed on a hay rake by removing the rake neck; providing an adaptor main beam assembly, providing a drive shaft, and providing hydraulic and/or electrical connections.

In one embodiment, the rake is modified by removing the neck, and the adapter frame is then bolted to the neck connection in the front of the rake. The adapter frame is U-bolted to the rear of the rake.

In another embodiment, the adaptor main beam is the supported below an existing rake main beam by bolting on the rear support to rear mounting brackets, and by bolting on a front support beam to a front flange. The main beam supports a front hitch and a rear hitch which may each may have adjustable length or height.

A drive shaft is supported by the main beam and a plurality of support bearings. Each end of the drive shaft includes a spline shaft end piece, so that the front may be attached to a tractor PTO and the rear may be attached to a baler PTO fitting.

Hydraulic hoses and electrical connector cables and fittings or provided and are preferably supported by the existing rake main beam.

In another embodiment, the adaptor main beam may be welded to the front and rear of the rake.

DETAILED DESCRIPTION OF EMBODIMENT

Method of Using the Converting Hay Rake

In order to use the converted rake apparatus, a tractor, the rake apparatus, and a baler are delivered to a field where hay has been cut. The devices may be delivered by trailer, or may be pulled to the field by the tractor.

The front of the rake is hitched to the tractor and the rake jack stand is removed and stored in a bracket provided on the rake frame. A telescoping PTO shaft is attached between the tractor and the rake. Hydraulic hoses on the front of the rake device are connected to the tractor. An electrical extension cable on the front of the rake is connected to the tractor.

The hay rake fold arms or other locking mechanism is disengaged. The fold arms are preferably stored in brackets on the rake frame.

A baler is hitched to the rear hitch of the rake device. A telescoping PTO shaft is attached between the rear of the rake shaft and the baler. Hydraulic hoses on rear of the rake device are connected to the baler. An electrical extension cable on the rear of the rake is connected to the baler.

The tractor is driven in the field to collect the hay with the rake and direct the hay into the baler.

What is claimed is:

1. An adapter kit for a hay wheel rake having a main beam, the adapter kit comprising
    an adapter main beam comprising
        a front drive shaft support bracket,
        a rear drive shaft support bracket,
        at least one intermediate drive shaft support positioned between the front drive shaft support bracket and the rear drive shaft support bracket, and
        a rear hitch;
    a rear main beam support positioned between the hay wheel rake main beam and the adapter main beam;
    a front main beam support positioned between the hay wheel rake main beam and the adapter main beam;
    a drive shaft comprising
        a first end comprising a PTO spline shaft end piece, and
        a second end comprising a PTO spline shaft end piece; and
    hydraulic hoses and connectors to provide hydraulic controls from the tractor to the rake and to the baler.

2. The adapter kit of claim 1 wherein the
    rear main beam support is attached to the hay wheel rake with a plurality U-bolts; and
    the front main beam support is bolted to the hay wheel rake.

3. The adapter kit of claim 1 wherein
    the rear main beam support is welded to the hay wheel rake; and
    the front main beam support is welded to the hay wheel rake.

4. The adapter kit of claim 1 wherein
    the rake further comprises a rear cross member having a right end and a left end; and
    the rear main beam support further comprises
        a first diagonal support having a first end attached in proximity the right end of the rear cross member, and a second end attached to the adapter main beam, and
        a second diagonal support having a first end attached in proximity the left end of the rear cross member, and a second end attached to the adapter main beam, thereby forming providing a v-shaped bracing for the rear cross member.

5. A method for adapting a wheel hay rake having a main beam to pull a baler in order to permit single pass raking and baling, the method comprising
    providing an adapter kit comprising
        an adapter main beam comprising
            a front drive shaft support bracket,
            a rear drive shaft support bracket,
            at least one intermediate drive shaft support positioned between the front drive shaft support bracket and the rear drive shaft support bracket, and
            a rear hitch,
        a rear main beam support positioned between the hay wheel rake main beam and the adapter main beam,
        a front main beam support positioned between the hay wheel rake main beam and the adapter main beam,
        a drive shaft comprising
            a first end comprising a PTO spline shaft end piece, and
            a second end comprising a PTO spline shaft end piece, and hydraulic hoses and connectors to provide hydraulic controls from the tractor to the rake and to the baler;
    attaching the adapter main beam rear main beam support and front main beam support to the wheel hay rake main beam;
    supporting the drive shaft on the adapter main beam front drive shaft support bracket, rear drive shaft support bracket, and intermediate drive shaft support;
    attaching a first end of the adapter main beam to a tractor;
    hitching the baler to the second end of the adapter main beam;
    attaching the first end of the drive shaft to the tractor PTO;
    attaching the second end of the drive shaft to the baler; and
    attaching the hydraulic hoses and connectors between the tractor and the baler, and between the tractor and the rake.

6. The method of claim 5 further comprising
    attaching the rear main beam support to the hay rake with a plurality U-bolts; and
    bolting the front main beam support to the hay rake.

7. The method of claim 5 further comprising
    welding the rear main beam support to the hay rake; and
    welding the front main beam support to the hay rake.

8. The method of claim 5 further comprising
    providing a rear cross member on the rake, such that the rear cross member having a right end and a left end; and
    providing the rear main beam support with a first diagonal support having a first end attached in proximity the right end of the rear cross member, and a second end attached to the adapter main beam, and a second diagonal support having a first end attached in proximity the left end of the rear cross member, and a second end attached to the adapter main beam, thereby forming providing a v-shaped bracing for the rear cross member.

9. An improved rake apparatus which permits a baler to be attached to a wheel hay rake in order to permit single pass raking and baling, the rake apparatus comprising a hay wheel rake with a rear wheel assembly and a main beam; and an adapter kit comprising an adapter main beam comprising a front drive shaft support bracket, a rear drive shaft support bracket, at least one intermediate drive shaft support positioned between the front drive shaft support bracket and the rear drive shaft support bracket, and a rear hitch, a rear main beam support positioned between the hay wheel rake main beam and the adapter main beam, a front main beam support positioned between the hay wheel rake main beam and the adapter main beam, a drive shaft comprising a first end comprising a PTO spline shaft end piece, and a second end comprising a PTO spline shaft end piece, and hydraulic hoses and connectors to provide hydraulic controls from the tractor to the rake and to the baler.

10. The rake apparatus of claim 9 wherein the
rear main beam support is attached to the hay rake with a plurality U-bolts; and
the front main beam support is bolted to the hay rake.

11. The rake apparatus of claim 9 wherein
the rear main beam support is welded to the hay rake; and
the front main beam support is welded to the hay rake.

12. The rake apparatus of claim 9 wherein
the rake further comprises a rear cross member having a right end and a left end; and
the rear main beam support further comprises
a first diagonal support having a first end attached in proximity the right end of the rear cross member, and a second end attached to the adapter main beam, and
a second diagonal support having a first end attached in proximity the left end of the rear cross member, and a second end attached to the adapter main beam, thereby forming providing a v-shaped bracing for the rear cross member.

* * * * *